Sept. 17, 1929.　　　L. O. GRONDAHL　　　1,728,562
CAR RETARDER
Filed Aug. 18, 1925　　2 Sheets-Sheet 1
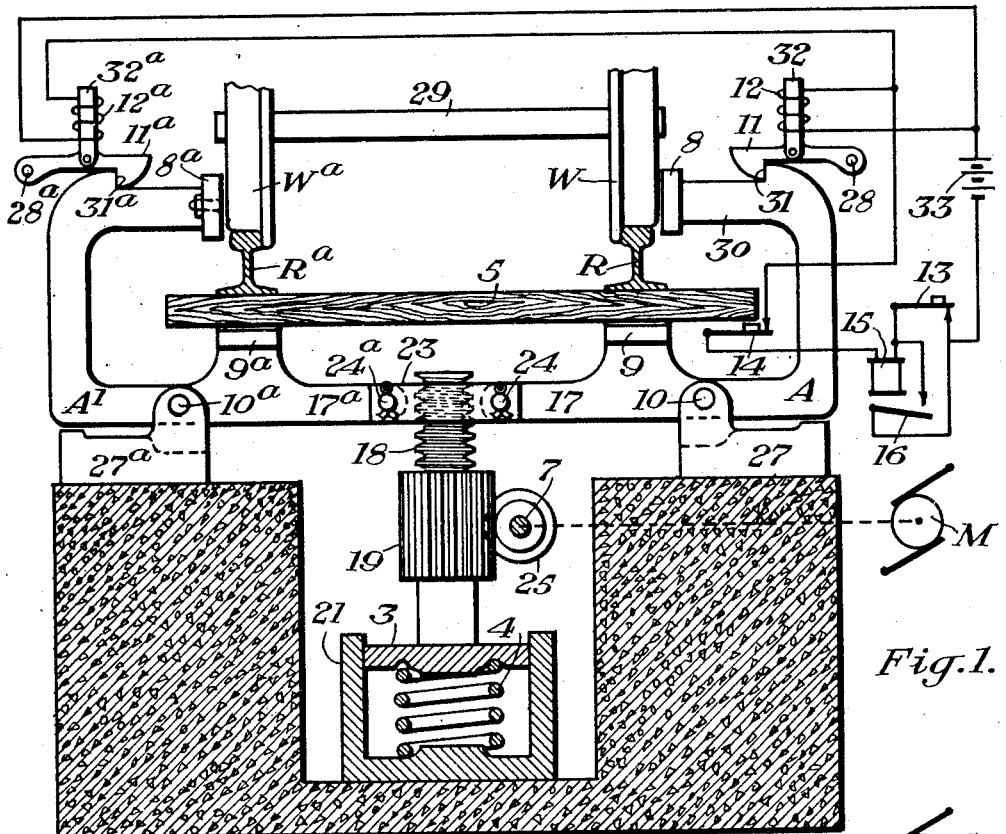
Fig. 1.
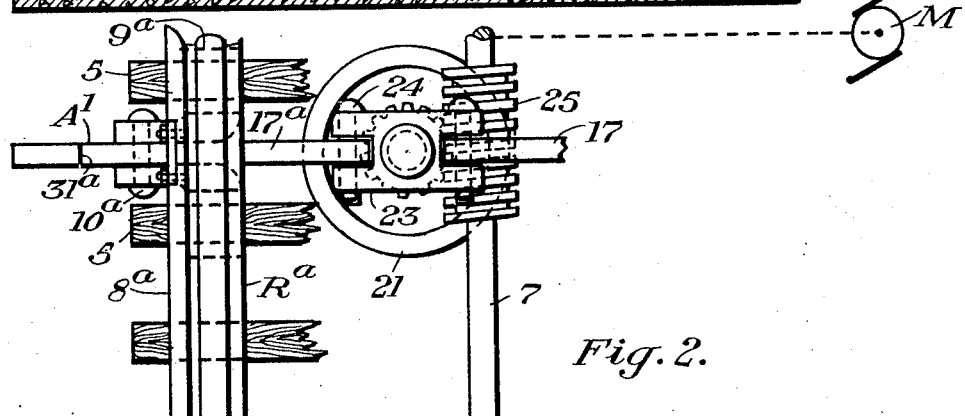
Fig. 2.
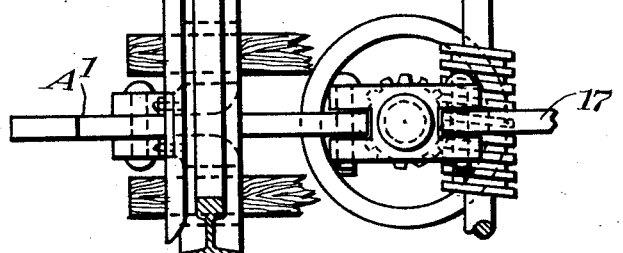

Sept. 17, 1929.  L. O. GRONDAHL  1,728,562
CAR RETARDER
Filed Aug. 18, 1925   2 Sheets-Sheet 2

Patented Sept. 17, 1929

1,728,562

UNITED STATES PATENT OFFICE

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

CAR RETARDER

Application filed August 18, 1925. Serial No. 50,898.

My invention relates to car retarders, that is to devices located in the trackway for reducing the speed of railway cars by co-action with the wheels or other parts of the cars.

I will describe several forms of car retarders embodying my invention, and will then point out the novel features thereof in claims.

Figure 3:
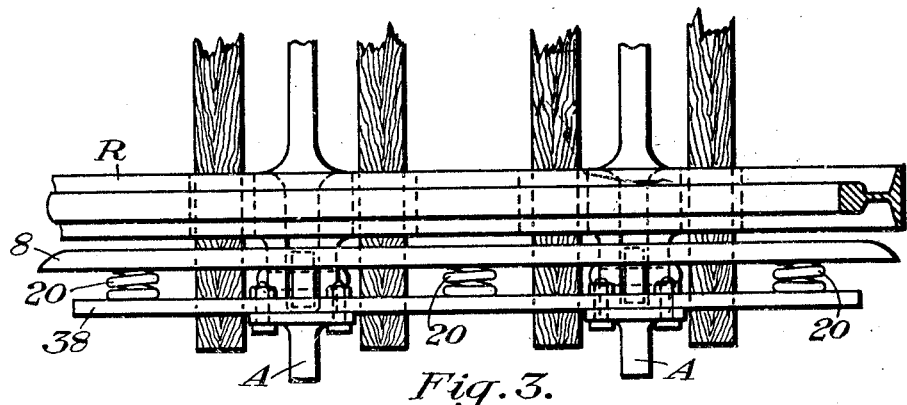
Figure 4:
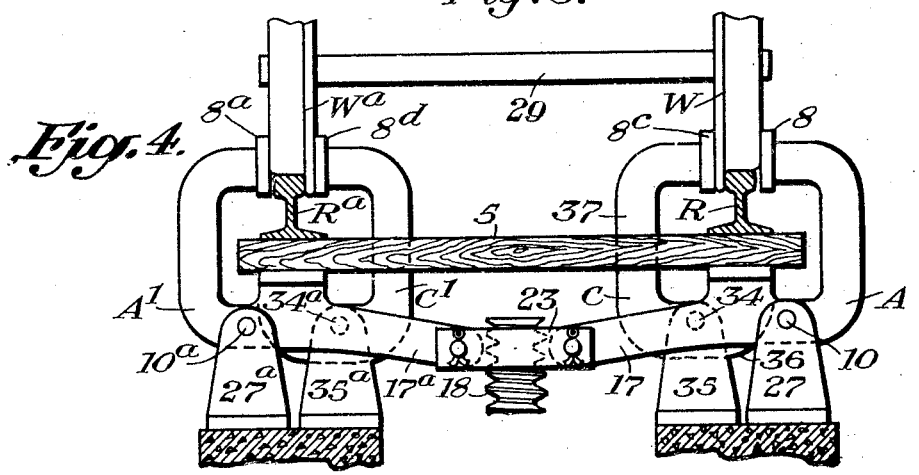
Figure 5:
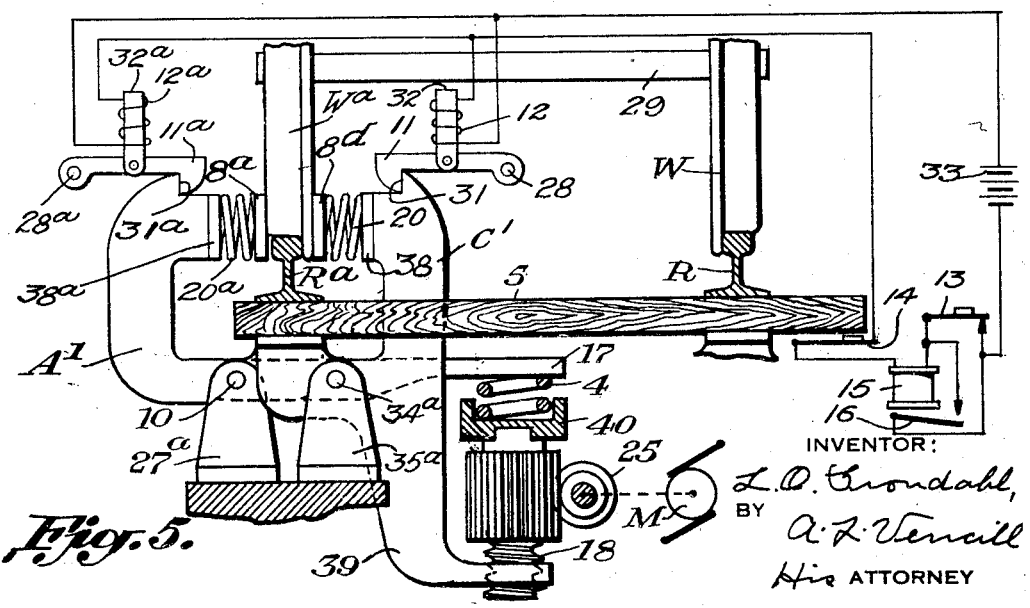

In the accompanying drawings, Fig. 1 is a view in end elevation of one form of car retarder embodying my invention. Fig. 2 is a top plan view of part of the retarder shown in Fig. 1. Fig. 3 is a view showing a modification of a portion of the retarder shown in Figs. 1 and 2. Fig. 4 is a view similar to Fig. 1 but showing two brake bars co-operating with each wheel of the car. Fig. 5 is a view showing a modification of a portion of the apparatus shown in Fig. 4.

Similar reference characters refer to similar parts in each of the several views.

Referring first to Figs. 1 and 2, the reference characters R and $R^a$ designate the track rails of the railway, which rails are supported on ties 5 in such manner that the weight of a car will cause these ties to move downwardly to an appreciable extent. Located on the rails R and $R^a$ are a pair of car wheels W and $W^a$ connected by an axle 29.

Pivotally mounted at the point 10 in a block 27 is a lever A having one arm 9 extended into a foot which is located under the track rail R and the ties 5, and a second arm 30 extending upwardly and terminating in or attached to a brake bar 8 located in close proximity to the outer side of the car wheel W. This lever is so shaped and proportioned that when the ties 5 are moved downwardly by the weight of the car the brake bar 8 is moved into engagement with the side of the wheel W with considerable force unless this movement is restrained. The movement of the lever A into braking position is normally restrained by a latch 11 which is pivotally mounted at the point 28 and is normally in position to engage a dog 31 formed on the arm 30 of the lever A. When this latch is in engagement with the dog 31, counter clockwise movement of the lever A about its pivotal point 10 is prevented and so the brake bar 8 does not engage with the car wheel W. Electromagnetic means are provided for at times swinging the latch 11 out of its restraining position, this means as here shown being a plunger 32 connected with the latch and a winding 12 surrounding the plunger When the winding 12 is energized the plunger 32 is driven upwardly therein and so the latch 11 is lifted out of position for engagement with the dog 31. The center of gravity of the lever A may be to the right of the pivotal point 10 so that when the track rails are unoccupied this lever will swing in clockwise direction to its normal position wherein the latch 11 will drop into engagement with the dog 31. If desired however other biasing means may be provided for causing the lever A to return to its normal position when the rails are unoccupied.

Associated with the lefthand track rail $R^a$ is a second lever $A'$ which is similar in all respects to the lever A but is so located that its associated brake bar $8^a$ co-operates with the outer face of the car wheel $W^a$. The lever $A'$ is pivotally mounted at $10^a$ in a block $27^a$, and is provided with a latch $11^a$ which normally restrains the movement of the lever $A'$ into braking position. The latch $11^a$ is pivotally mounted at point $28^a$ and is provided with a plunger $32^a$ controlled by a solenoid $12^a$ arranged when energized to swing the latch out of restraining position.

The solenoids 12 and $12^a$ may be controlled in any suitable manner. As here shown they are controlled by a normally open manually operable contact 13, and by a normally closed contact 14 which is opened by the downward movement of one of the ties 5 when a car passes the retarder. When the contact 13 is closed, it completes a circuit which passes from battery 33, through contact 13, winding of a relay 15, contact 14 and solenoids 12 and $12^a$ in multiple to battery 33. The solenoids 12 and $12^a$ then function to raise the latches 11 and $11^a$ out of restraining positions, so that a car passing through the retarder will have its speed reduced by the engagement of the brake bars 8 and 8ᵃ with the wheels W and Wᵃ, respectively. The energization of relay 15 will cause contact 16 of this relay to close and this contact will close a branch around the manually operable contact 13, so that contact 13 may be released without causing de-energization of the solenoids 12 and 12ᵃ. These solenoids will then remain energized until the contact 14 is opened by a car passing through the retarder.

In order to adjustably limit the braking action of the brake bars 8 and 8ᵃ, and also to release the retarder if a car comes to rest with the brake bars in engagement with the wheels, the two levers A and A' are provided with arms 17 and 17ᵃ respectively, and means are provided for limiting the downward movements of these arms as well as for raising these arms when it is necessary to release the retarder. This means as here shown comprises a block 23 the ends of which are bifurcated to receive the ends of the arms 17 and 17ᵃ respectively, the bifurcated ends of block 23 being pivotally attached to these arms by studs 24 and 24ᵃ. The block 23 is provided with a threaded hole to receive a screw 18 which is attached to a gear 19 co-acting with a worm 25 which is mounted on a shaft 7 and is driven by an electric motor M. This motor may be controlled from a distant point such for example as the cabin wherein the manually operable contact 13 is usually located. The lower end of the screw 18 terminates in a plunger 3 which moves in a cup-shaped guide 21, and a coiled spring 4 is interposed between this plunger and the floor of the guide. The amount of compression of this spring is determined by the distance between block 23 and the plunger 3. When bars 8 and 8ᵃ are in contact with the car wheels, the block 23 will occupy a definite position assuming that block 23 is relatively low on the screw 18, then when this block occupies its definite position due to the brake bars being in contact with the car wheels, the spring is under a relatively light compression so that a relatively large proportion of the car weight is effective at the brake bars to produce braking effort. Conversely, assuming that the block 23 is relatively high on the screw 18, then when the block 23 is in the same definite position the spring is under a relatively heavy compression and a relatively small proportion of the car weight is effective at the brake bars to produce braking effort. It is of course understood that the force required to compress a spring increases substantially in proportion to increase in the amount of compression of the spring.

It will be seen that if a car comes to rest in the retarder while the levers A and A' are in braking positions, these levers may be released by raising the arms 17 and 17ᵃ by suitable operation of the motor M.

When the operator desires to retard a car he will first cause operation of the motor M to place the block 23 in such position on the screw 18 as to accomplish the desired braking effort, and he will then close contact 13 to release these levers. After the car passes through the retarder the latches 11 and 11ᵃ will be automatically released by the contact 14, and the levers A and A' will automatically return to their non-breaking positions wherein they will be locked.

As shown in Fig. 2 the brake bar 8ᵃ extends longitudinally along the track for a considerable distance, and is provided with two levers A', A', located at spaced longitudinal points on the bar 8ᵃ. A larger number of levers A' may be provided for the arm 8ᵃ if desired.

Referring now to Fig. 3 the apparatus in the form here shown is the same as that shown in Figs. 1 and 2 except that the brake bar 8 is separate from the levers A and is spaced therefrom by springs 20, these springs co-acting with a longitudinal arm 38 which is attached to or integral with the levers A.

As shown in Fig. 1 there is but one brake bar co-acting with each wheel W and Wᵃ. In some instances it may be desirable to provide two brake bars for each wheel co-acting respectively with the opposite faces of such wheel. Referring now to Fig. 4, the apparatus shown in this view is similar to that shown in Fig. 1 in so far as levers A and A' are concerned but the retarder is provided with two additional levers C and C'. Lever C is pivotally mounted at point 34 in a block 35 and is provided with an arm 36 located under the track rail R and with an upwardly extending arm 37 which terminates in a brake bar 8ᶜ arranged to co-act with the inner surface of the car wheel W. When the ties 5 move downwardly in response to the weight of the car the lever C is swung in clockwise direction around its pivotal point 34 so that brake bar 8ᶜ engages the wheel W with considerable pressure. The wheel W is thus clamped between the two brake bars 8 and 8ᶜ, so that the forces exerted on this wheel by the retarder are substantially equal and opposite, with the result that the strain on the axle 29 is substantially zero. The structure and operation of the lever C' will be understood without further explanation, the brake bar associated with this lever being designated 8ᵈ. The levers A and A' shown in Fig. 4 may be provided with restraining latches or with adjustable limiting means, or with both as shown in Fig. 1.

Referring now to Fig. 5, the apparatus shown in this view is similar to that shown in Fig. 4 except that the lever C' is provided with a third arm 39 which projects downwardly beneath arm 17 and is provided with a threaded hole to receive the screw 18. This screw is provided as in Fig. 1 with a gear 19 co-acting with a worm 25 which is driven by an electric motor M. The upper end of the screw 18 carries a cradle 40, and between this cradle and the arm 17 is a coil spring 4. When a car is in the retarder, the arms 17 and 39 will occupy definite positions, and so the braking effort may be varied by varying the compression of the spring at that time; the compression of the spring can of course be varied by varying the position of cradle 40 with respect to arm 17 by turning screw 18 in one direction or the other. In the event of the car coming to rest in the retarder, the retarder may be released by causing motor M to operate in such direction and to such extent as to spread arms 17 and 39. As here shown, the levers $A^1$ and $C^1$ are provided with restraining latches and controlling means for these latches, all as shown in Fig. 1, and springs 20 or $20^a$ are interposed between the longitudinal arms 38 or $38^a$ and and the brake bars as shown in Fig. 3.

Although I have herein shown and described only a few forms of car retarders embodying my invention, it is understood that various changes and modifications may be made therein within the scope of the appended claims without departing from the spirit and scope of my invention.

Having thus described my invention, what I claim is:

1. A car retarder comprising a brake bar, means operated by the weight of a car for moving said bar into engagement with a wheel of the car, and means for restraining the movement of said bar into engagement with the wheel.

2. A car retarder comprising a brake bar, means operated by the weight of a car for moving said bar into engagement with a wheel of the car, and means for limiting the pressure exerted by said bar against the wheel in response to the weight of a car.

3. A car retarder comprising a brake bar, means operated by the weight of a car for moving said bar into engagement with a wheel of a car, a latch for restraining such movement of said bar, and electro-magnetic means for releasing said latch.

4. A car retarder comprising a brake bar, means operated by the weight of a car for moving said bar into engagement with a wheel of a car, a latch for restraining such movement of said bar, a magnet for releasing said latch, a circuit for said magnet including a manually operable contact, and means associated with said circuit for keeping the magnet energized after said contact has been momentarily closed until a car operates said brake bar.

5. A car retarder comprising a brake bar, means operated by the weight of a car for moving said bar into engagement with a wheel of a car, a latch for restraining such movement of said bar, a magnet for releasing said latch, a circuit for said magnet including a normally open manually operable contact, a normally closed contact opened when a car operates said brake bar, and a relay winding; and a shunt around said manually operable contact and including a front contact of said relay.

6. A car retarder comprising a brake bar, means for causing operation of said bar including a normally deenergized magnet, a circuit for said magnet including a manually operable contact, and means associated with said circuit for keeping the magnet energized after said contact has been momentarily closed until a car passes said brake bar.

7. A car retarder comprising a brake bar, means for causing operation of said bar including a normally deenergized magnet, a circuit for said magnet including a normally open manually operable contact, a normally closed contact opened when a car operates said brake bar, and a relay winding; and a shunt around said manually operable contact and including a front contact of said relay.

8. A car retarder comprising a member mounted to be depressed by the weight of a car, a brake bar moved into braking position by said member when depressed, and means for restraining the depression of said member.

9. A car retarder comprising a member mounted to be depressed by the weight of a car, a brake bar moved into braking position by said member when depressed, and a spring interposed between said member and said brake bar.

10. A car retarder comprising a lever having one arm located under a track rail for depression by the weight of a car and another arm located in position for engagement with a side of a car wheel, and means for restraining movement of said lever in response to the weight of a car.

11. A car retarder comprising a lever having one arm located under a track rail for depression by the weight of a car and another arm located adjacent the side of a car wheel, a brake bar arranged to be moved by said second arm into engagement with the car wheel, and a spring interposed between said second lever arm and said brake bar.

12. A car retarder comprising a lever having one arm located under a track rail for depression by the weight of a car and another arm located in position for engagement with a side of a car wheel, a latch for restraining movement of said lever in response to the weight of a car, an electromagnetic means for releasing said latch.

13. A car retarder comprising a member mounted to be depressed by the weight of a car, a brake bar moved into braking position by said member when depressed, means for preventing movement of said brake bar in response to the weight of a car, and means for adjustably limiting the braking pressure exerted by said bar when said preventing means is not effective.

14. A car retarder comprising a brake bar, means operated by the weight of a car for moving said bar into engagement with a wheel of a car, means for preventing movement of said brake bar in response to the weight of a car, and means for adjustably limiting the braking pressure exerted by said bar when said preventing means is not effective.

15. A car retarder comprising a lever having one arm located under a track rail for depression by the weight of a car and another arm located in position for engagement with a side of a car wheel and a third arm, and means co-acting with said third arm for limiting the braking pressure exerted by said lever in response to the weight of a car.

16. A car retarder comprising a brake bar, means operated by the weight of a car for moving said bar into engagement with a wheel of a car, and means for releasing said retarder if a car stops therein.

17. A car retarder comprising a lever having one arm located under a track rail for depression by the weight of a car and another arm located in position for engagement with a side of a car wheel and a third arm, and means co-acting with said third arm for releasing said second arm from the wheel if a car stops in the retarder.

18. A car retarder comprising a brake bar, means operated by the weight of a car for moving said bar into engagement with a wheel of a car, and a screw jack for moving said bar out of engagement with the wheel if a car stops in the retarder.

19. A car retarder comprising a brake bar, means operated by the weight of a car for moving said bar into engagement with a wheel of a car, and a screw jack for limiting the braking pressure exerted by said bar and for releasing the bar from the car wheel if a car stops in the retarder.

20. A car retarder comprising a brake bar, means operated by the weight of a car for moving said bar into engagement with a wheel of a car, a screw jack for moving said bar out of engagement with a car wheel, and an electric motor for operating said jack.

21. A car retarder comprising a brake bar, means operated by the weight of a car for moving said bar into engagement with a wheel of a car, a latch for restraining such movement of said bar, a magnet for releasing said latch, a screw device for limiting the braking pressure exerted by said bar in response to the weight of a car, a motor for operating said screw device, and means for controlling said magnet and said motor from a distant point.

22. A car retarder comprising a brake bar, means operated by the weight of a car for moving said bar into engagement with a wheel of a car, a latch for restraining such movement of said bar, electromagnetic means for releasing said latch, and a screw device for adjustably limiting the braking pressure exerted by said bar when the bar is released.

23. A car retarder comprising a brake bar, means operated by the weight of a car for moving said bar into engagement with a wheel of a car, and a screw device for adjustably limiting the pressure exerted on the car wheel by said bar.

24. A car retarder comprising a brake bar, means operated by the weight of a car for moving said bar into engagement with a wheel of a car, and means controlled from a distant point for adjustably limiting the pressure exerted on the car wheel by said bar.

25. A car retarder comprising a lever having one arm located under a track rail for depression by the weight of a car and another arm located in position for engagement with a side of a car wheel when the first arm is depressed, and a third arm; a second lever having one arm located under the track rail for depression by the weight of a car, and a second arm located in position for engagement with the other side of the car wheel when the first arm is depressed, and a third arm; and means co-acting with said third arms for adjustably limiting the pressures exerted on the car wheel by the second arms of said levers.

26. A car retarder comprising a lever having one arm located under a track rail for depression by the weight of a car and another arm located in position for engagement with a side of a car wheel, when the first arm is depressed, and a third arm; a second lever having one arm located under the track rail for depression by the weight of a car, and a second arm located in position for engagement with the other side of the car wheel when the first arm is depressed, and a third arm; a screw device co-acting with said third arms for adjustably limiting the pressures exerted on the car wheel by the second arms of said levers, and a motor for operating said screw device.

27. A car retarder comprising a brake bar, means operated by the weight of a car for moving said bar into engagement with a wheel of a car, a second brake bar, and means operated by the weight of the car for moving said second bar into engagement with the other side of the car wheel.

28. A car retarder comprising a brake bar, means operated by the weight of a car for moving said bar into engagement with a wheel of a car, a second brake bar, means operated by the weight of the car for moving said second bar into engagement with the other side of the car wheel, and means for adjustably limiting the pressure exerted on the wheel by at least one of said bars.

29. A car retarder comprising a brake bar, means operated by the weight of a car for moving said bar into engagement with a wheel of a car, a second brake bar, means operated by the weight of the car for moving said second bar into engagement with the other side of the car wheel, and means for adjustably limiting the pressures exerted on the wheel by said bars.

30. A car retarder comprising a braking member constantly in position to be operated by the weight of a car, and means for restraining operation of said member in response to the weight of a car.

31. A car retarder comprising a brake bar movable into engagement with a car wheel by the weight of a car, and means including a spring and a screw device for adjustably limiting the pressure exerted on the wheel by said bar.

32. A car retarder comprising a brake bar movable into engagement with a car wheel by the weight of a car, a spring for limiting the pressure of said bar on the car wheel, and means for varying the effect of said spring on said bar.

33. A car retarder comprising a brake bar movable into engagement with a car wheel by the weight of a car, a spring for limiting the pressure of said bar on the car wheel, and remotely controlled means for varying the compression of said spring.

34. A car retarder comprising a lever having one arm located under a track rail for depression by the weight of a car and another arm located in position for engagement with a side of a car wheel and a third arm, a spring coacting with said third arm for limiting the pressure exerted on the car wheel by said second arm, and means for varying the effect of said spring on said third arm.

35. A car retarder comprising a lever having one arm located under a track rail for depression by the weight of a car and another arm located in position for engagement with a side of a car wheel when the first arm is depressed, and a third arm; a second lever having one arm located under the track rail for depression by the weight of a car, and a second arm located in position for engagement with the other side of the car wheel when the first arm is depressed, and a third arm; a spring interposed between said third arms, and means for varying the force exerted on said third arms by said spring.

36. A car retarder comprising a brake bar, means operated by the weight of a car for moving said bar into engagement with a wheel of a car, a second brake bar, means operated by the weight of the car for moving said second bar into engagement with the other side of the car wheel, a spring for limiting the pressures exerted by said bars on a car wheel, and means for varying the effect of said spring on said bars.

In witness whereof I affix my signature.
LARS O. GRONDAHL.